2,941,200
FREQUENCY MODULATED PULSE RADAR

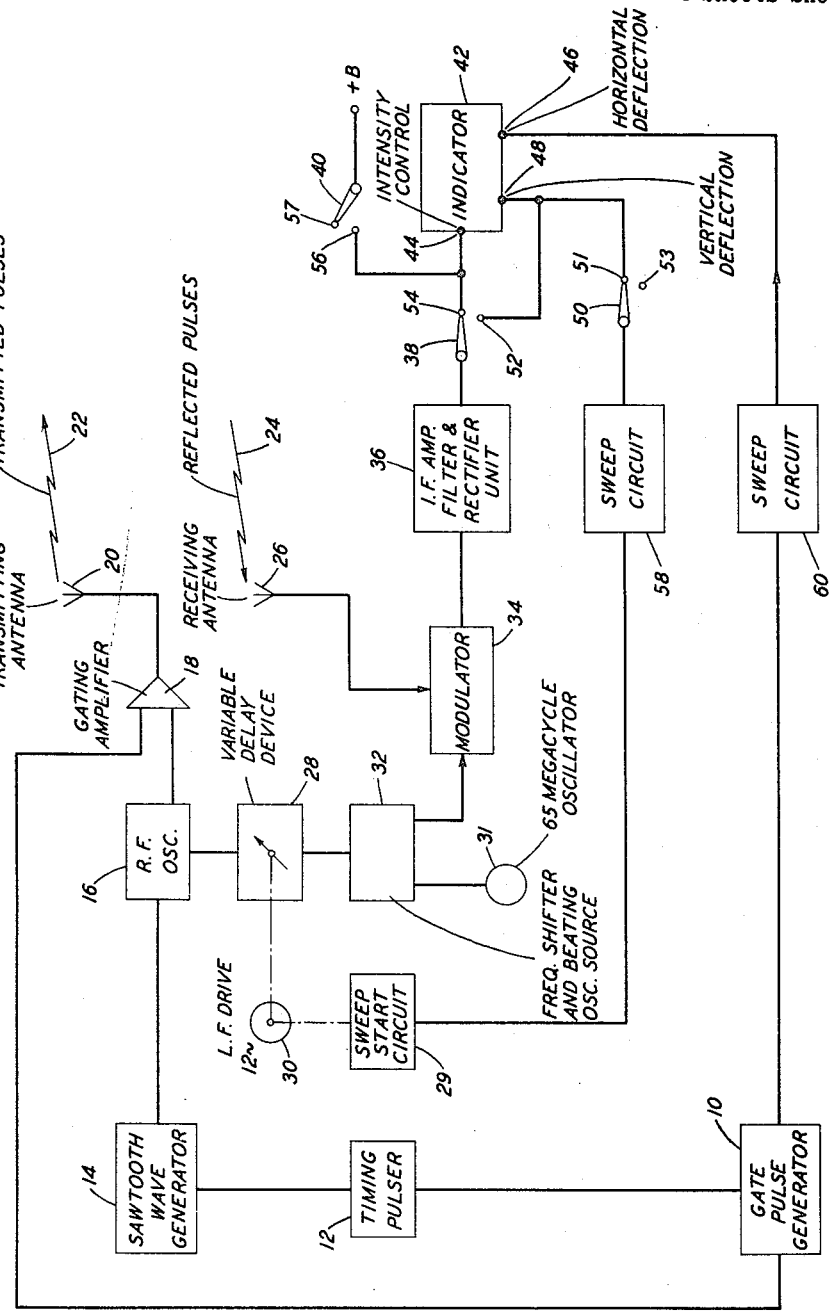

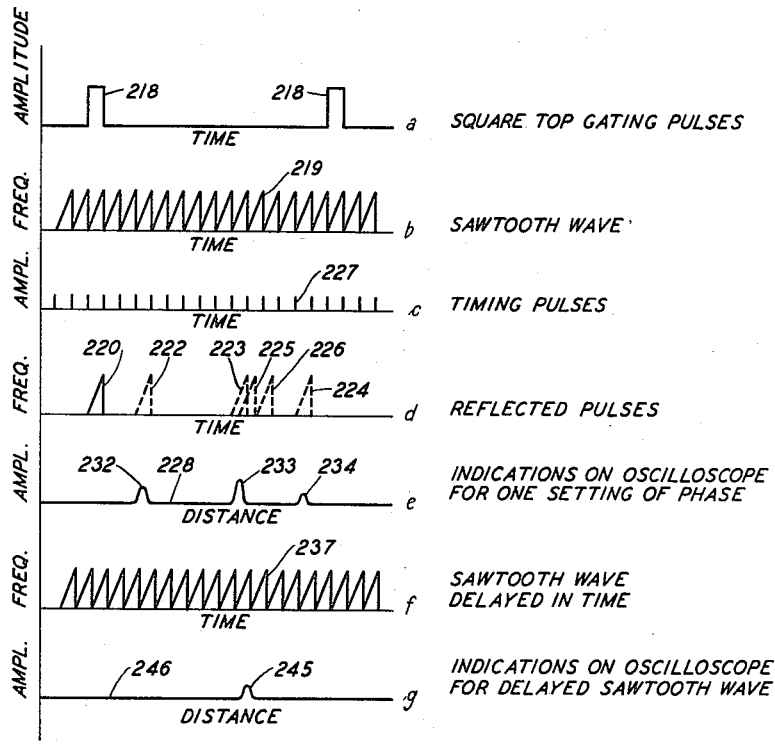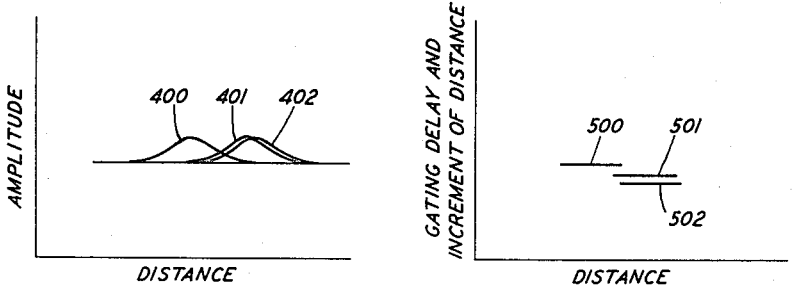

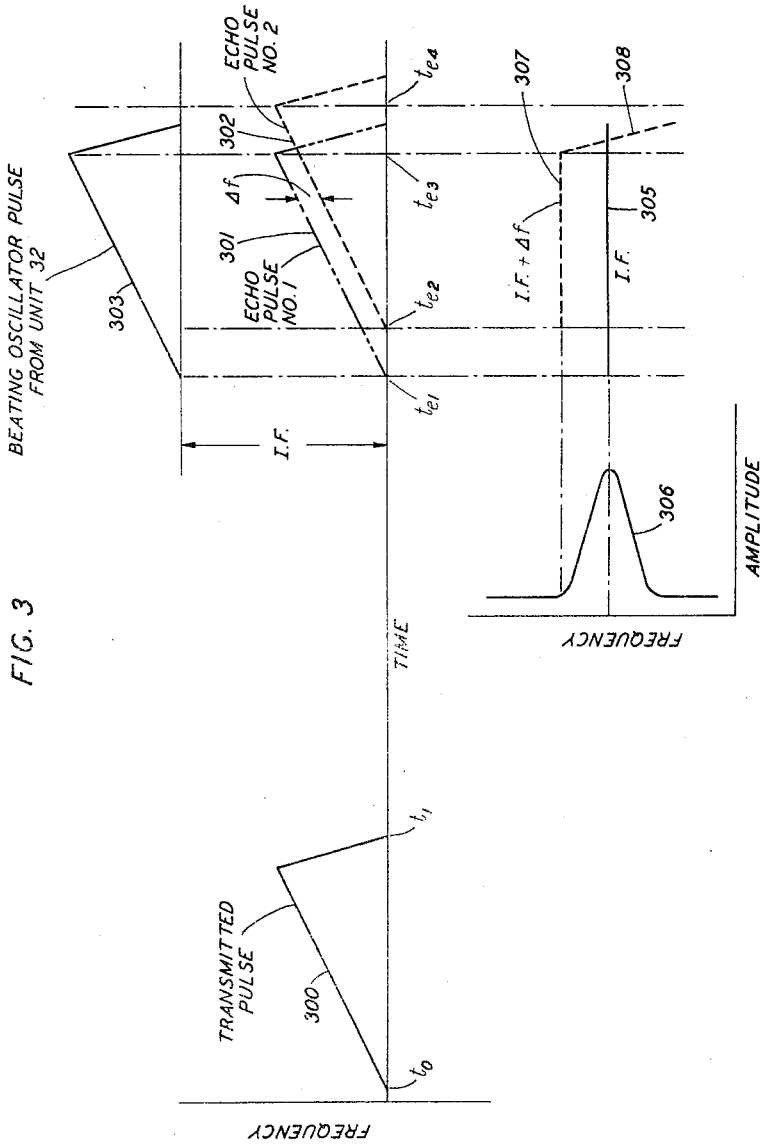

Owen E. De Lange, Rumson, and Anselm F. Dietrich, West Long Branch, N.J., assignors to Bell Telephone Laboratories, Incorporated, New York, N.Y., a corporation of New York Filed July 28, 1953, Ser. No. 370,692

2 Claims. (Cl. 343—17.2)

This invention relates to an improved radar system of the frequency modulated pulse type. More particularly, it relates to an improved rearrangement of a radar system of the above-indicated type which makes more fully and effectively available the high degree of range resolution combined with exceptionally long range operation, afforded by this type of system.

The principal object of the invention is, accordingly, to improve the range resolution of radar ssytems of the frequency modulated pulse type, in which indications of all reflecting objects within an extended operating range are simultaneously presented on the indicator of the system so that no interference will arise between the indications of reflecting objects, the respective ranges of which differ but slightly from each other.

Another object is to increase the utility of radar systems in that slightly differing ranges between adjacent reflecting objects can be accurately determined on an indicator presenting a pattern of indications from all reflecting objects within the maximum range of the system, simultaneously.

Other and further objects and features of the invention will become apparent during the course of the detailed description of an illustrative system of the invention, given below, and from the appended claims.

In the accompanying drawings:

Fig. 1 shows in block schematic diagram form one type of illustrative system embodying the principles of the invention;

Fig. 2 comprises pulse versus time diagrams employed in explaining the operation of the system of Fig. 1;

Fig. 3 comprises a simplified pulse versus time diagram also employed in explaining the operation of the system of Fig. 1;

Fig. 4 illustrates an "A type" indication obtainable with the system of Fig. 1;

Fig. 5 illustrates an improved type of indication obtainable with the system of Fig. 1 when operated in accordance with the principles of the invention;

Figure 6:
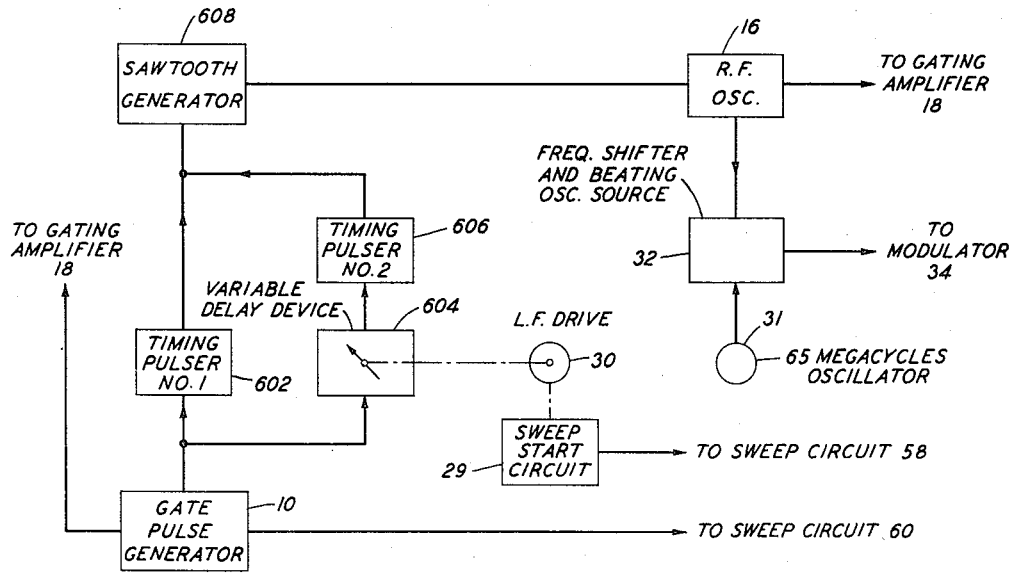
Fig. 6 shows in block schematic diagram form a modified timing circuit for use in the illustrative system of Fig. 1.

In more detail in Fig. 1, radio frequency oscillator 16 is shown which can be, for example, a circuit including a vacuum tube of the velocity variation, or so-called klystron, type, having a repeller anode, the frequency of the oscillator varying over a substantial range with suitable change of voltage applied to its repeller anode.

Interposed between oscillator 16 and transmitting antenna 20 is a gating amplifier 18 which is normally biased to cut-off but (in the present circuit) is unblocked by a gate pulse from gate pulse generator 10.

Generator 10 provides regularly spaced rectangular pulses, the interval between adjacent pulses being sufficient, as will presently become apparent, to permit the reception of reflected energy from an object at the maximum range to be measured prior to the occurrence of the next successive pulse.

The repeller anode of the oscillator tube employed in oscillator 16 is connected to the output of sawtooth voltage wave generator 14. Each tooth of the sawtooth wave provided by generator 14 is completed during a time interval equal to that of the individual gating pulses from generator 10. Each tooth provides a substantially linear voltage variation sufficient to cause the frequency of oscillator 16 to sweep through a frequency interval which may, for example, be 100 megacycles when the median operating radio frequency is in the neighborhood of 4000 megacycles. A suitable duration of the rectangular pulses from generator 10 and the sawtooth pulses from generator 14 is, by way of example, 1 microsecond, each.

The sawtooth voltage wave generator 14 is controlled as to timing by the timing pulser 12 which provides a series of sharp pulses spaced at intervals equal to the gate pulse width, i.e., in the present instance at 1 microsecond intervals. Pulser 12 itself is synchronized by the gate pulses from generator 10. It should be noted that although the generator 14 repeats its sawtooth wave sweep every microsecond, a variable frequency pulse is transmitted to antenna 20 and transmitted pulses 22 are emitted only during the 1 microsecond intervals in which the gating pulses from generator 10 unblock the gating amplifier 18.

As for the majority of radar systems, transmitting antenna 20 and receiving antenna 26 should be sharply directive so that the angular direction of objects from which reflections are received can be accurately determined by observing the direction toward which the antennas are pointed. Alternatively, a single antenna and appropriate duplexing units may be employed as with many conventional radars using "TR" and "RT" boxes.

A small amount of energy from radio frequency oscillator 16, as frequency modulated under control of the sawtooth wave generator 14, is taken through variable delay device 28 to frequency shifter and beating oscillator source 32. A highly stable 65 megacycle oscillator 31 is also connected to unit 32. Unit 32 combines the sawtooth frequency modulated pulses and the 65 megacycle wave to provide a sawtooth frequency modulated pulse train differing by 65 megacycles from the original pulse train. The output of unit 32 is then supplied to modulator 34 where it is combined with reflections 24 of the transmitted pulses, being received on antenna 26. Antenna 26 is connected to modulator 34 as shown.

The received reflected pulses which are in phase with a frequency shifted sawtooth wave pulse from unit 32 are combined in modulator 34 with the in-phase sawtooth pulse from unit 32 to provide constant frequency pulses of 65 megacycles in the output of modulator 34. These pulses are then transmitted to the intermediate frequency amplifier, filter and rectifier unit 36, the filter section of which sharply discriminates against all but the 65 megacycle pulses. These pulses are then amplified and rectified by unit 36 and, with switch 38 turned to contact 54, are applied to the intensity control terminal 44 of cathode ray indicator 42 causing the beam of the cathode ray indicator to be intensified during the receipt of each 65 megacycle pulse.

A sweep circuit 60 which is controlled by pulses from gate pulse generator 10 provides a linear sweep to the horizontal deflecting means terminal 46 of indicator 42 and is designed to cause the beam of the indicator to traverse the screen of the indicator horizontally at a uniform rate following the occurrence of each gate pulse of generator 10. The time required for each such horizontal sweep is that required for a transmitted pulse to travel from antenna 20 to a reflecting object at the maximum range to be measured, and a reflection of the transmitted pulse to travel from said object to the receiving antenna 26.

As will become more clearly apparent hereinunder, in connection with the discussion of the pulse diagrams of Figs. 2 and 3, for any setting of variable delay device 28 a plurality of reflected pulses may be received for each transmitted pulse provided a plurality of reflecting objects are in the path of the emitted pulses at ranges such that each of the reflected pulses is in phase with a tooth of the sawtooth wave reaching modulator 34 from unit 32. Such reflected pulses must, of course, be spaced from each other by at least the width of a sawtooth pulse (i.e., 1 microsecond or, as will presently be explained, their respective corresponding reflecting objects must be displaced by a multiple of 500 feet in range). In order to receive intermediate reflected pulses, variable delay device 28 is driven by low frequency drive 30 at a low rate, for example, 12 times (or cycles) per second, to vary its delay over a range corresponding substantially to 1 microsecond delay. Alternatively, when it is desired to examine more carefully the individual range indication of one or more of several objects closely adjacent in range, drive 30 is preferably arranged so that it can be turned or adjusted manually.

Sweep circuit 58 is connected to sweep start circuit 29 which in turn is actuated by drive 30 and the sweeping action is thus synchronized with the delay variation cycles of variable delay device 28. To facilitate the resolution of small range differences, sweep circuit 58 should be provided with selective scale segment expanding means, which can, by way of example, be of the type described and claimed in the copending application Serial No. 339,585, filed June 8, 1940, by W. C. Tinus, assignor to applicants' assignee, whereby selected portions of its total range sweep can be individually expanded. This application matured into Patent 2,790,170, granted April 23, 1957. The output of sweep circuit 58 is normally connected through switch 50 set on contact 51 to vertical deflection terminal 48 of indicator 42. From the above arrangement, it is apparent that for each setting of variable delay device 28 the horizontal trace across the screen of indicator 42 will occupy a position displaced vertically from horizontal sweeps corresponding to other positions of variable delay device 28. Therefore, indications closely adjacent in range will be displaced vertically as well as horizontally and will not tend to merge with each other as they would if a single horizontal trace were employed. As will be discussed in more detail hereinunder, the vertical separation between two closely adjacent indications is also, obviously, a measure of the difference in range of their respective corresponding reflecting objects and the vertical deflection of the indications, therefore, makes available a readily expandable scale from which the range increment, with respect to the nearest multiple of 500 feet, can be read.

The operation of the radar system of Fig. 1 will be more readily comprehended when considered in connection with the pulse diagrams of Figs. 2 and 3.

In Fig. 2 the rectangular pulses 218, shown in diagram a, represent the gating pulses from generator 10. The series of sawtooth wave pulses 219, shown in diagram b, represent the voltage wave provided by generator 14. These pulses can also obviously represent the frequency modulated radio frequency pulses generated by oscillator 16. The series of sharp regularly recurrent pulses 227 of diagram c represents the timing pulses from pulser 12. In diagram d pulse 220 represents a transmitted pulse as provided to antenna 20 when gating amplifier 18 is unblocked by a gate pulse 218 from generator 10. Its frequency is, of course, swept, as explained above, by a tooth of the sawtooth wave of voltage generator 14 which is synchronized with the gating pulse. Pulses 222 to 226, inclusive, represent reflections of pulses 220 received on antenna 26 from objects at various distances or ranges from the radar system.

In diagram e line 228, including pulses 232, 233 and 234, represents the indication that would be obtained on indicator 42 if variable delay device 28 were fixed in its zero position, i.e., with the sawtooth wave of diagram b having a sawtooth pulse synchronized with the gating pulse 218 of diagram a, and switches 40, 38 and 50 were placed on contacts 56, 52 and 53, respectively. With the switches so placed a constant intensity beam of the oscilloscope would be swept horizontally over the same trace for each sweep and pulses from unit 36 would produce vertical deflections at points corresponding to the ranges of the respective deflecting objects from which each pulse is received, as in the conventional pulse type radar system. No indication appears on diagram e for received reflected pulses 225 and 226 because neither of these pulses is in phase with a sawtooth pulse of the wave of diagram b (see Fig. 3 and description thereof below). However, if variable delay device 28 were adjusted, as illustrated in diagram f, to bring a tooth of the sawtooth wave (output of unit 32) into coincidence with, for example, received reflected pulse 225, then the horizontal trace 246 of diagram g, as it would appear on indicator 42, would include an indication 245 corresponding to the pulse 225. Similarly, further adjustment of variable delay device 28 would bring a tooth of the sawtooth wave into coincidence with pulse 226 and would result in a horizontal trace on indicator 42 having an indication corresponding to the pulse 226.

With switches 40, 38 and 50 of Fig. 1 restored to contacts 57, 54, and 51, respectively, as shown, the indications above described will take the form of intensified or brightened spots along the trace and, as explained above, in connection with Fig. 1, the traces will be separated vertically from each other. These features will become apparent during the discussion of Fig. 5 hereinunder.

The fundamental phenomena described above in connection with the system of Fig. 1 and the associated pulse diagrams of Fig. 2 will perhaps be more readily apparent from a consideration of the simplified pulse diagram of Fig. 3.

In Fig. 3 pulse 300 represents a transmitted pulse radiated from antenna 20 of Fig. 1 during the time interval $t_0$ to $t_1$. Pulses 301 and 302 represent reflections or echoes of pulse 300 received by antenna 26 of Fig. 1 at times during the time intervals $t_{e_1}$ to $t_{e_3}$, and $t_{e_2}$ to $t_{e_4}$, respectively. Pulse 303 represents a single pulse of the sawtooth wave from unit 32 of Fig. 1 (commonly designated a beating oscillator pulse).

Assuming that the adjustment of variable delay device 28 is such that pulse 303 is coincident in time with pulse 301, as illustrated in Fig. 3, the two will combine to produce a constant frequency pulse 305 of the intermediate frequency (65 megacycles).

Because of the time displacement $t_{e_1}$ to $t_{e_2}$, the frequency of pulse 302 will differ from that of pulse 301 by $\Delta f$ throughout the interval $t_{e_2}$ to $t_{e_3}$ so that when combined with pulse 303 a constant frequency pulse 307 having a frequency I.F.$+\Delta f$ between $t_{e_2}$ and $t_{e_3}$ will result, the pulse 307 being followed by a rapidly changing portion 308 which will produce no substantial effect.

Curve 306 represents the frequency discriminatory characteristic of the filter portion of unit 36 and is aligned so that pulse 305 will freely pass through unit 36, while pulse 307 and all but a negligible portion of its trailing edge 308 will be excluded. Thus, an indication corresponding to pulse 301 only will appear on indicator 42.

Obviously, further adjustment of variable delay device 28 could result in bringing pulse 303 (or an adjacent pulse of the sawtooth wave from unit 32) into time coincidence with pulse 302 in which case an indication corresponding to pulse 302 only would appear on indicator 42.

To illustrate more fully the advantages of the system of Fig. 1, we can, by again throwing switch 38 to contact 52 and switch 50 to contact 53 and closing switch 40 to connect a suitable $+B$ potential to intensity control terminal 44 of indicator 42, but this time leaving drive 30 running to recurrently vary the delay of unit 28 through its normal range of variation, convert the system to one in which all indications appear as vertical deflections on a single horizontal trace. A typical series of indications is shown in Fig. 4 in which indications 400, 401 and 402 represent three received echo pulses which are closely adjacent in time. Pulses, corresponding to indications 401 and 402 particularly have, evidently, arrived at nearly the same time (indicating two reflecting objects at nearly the same distance or range from the radar system). It is obvious from Fig. 4 that all three indications overlap each other to some extent and that indications 401 and 402 do so to such an extent that they tend to merge together and could readily be mistaken for a single indication.

Any confusion from overlapping and merging of pulse indications closely adjacent in time can be resolved by restoring switches 40, 50 and 38 to the positions shown in Fig. 1, in which case the indication pattern is shown in Fig. 5, wherein indications 500, 501 and 502 correspond to indications 400, 401 and 402 of Fig. 4, respectively. By virtue of the added vertical deflecting voltage, each indication of Fig. 5 is displaced vertically with respect to adjacent indications and the tendency of the indications to overlap, or for several to merge together, is, obviously, eliminated. Furthermore, by expanding the vertical sweep or such portion of it as includes two closely adjacent indications, the range difference can be readily ascertained to the expanded scale thus afforded. It should perhaps be pointed out that both the sweep voltage and the signal or "echo" voltages could be applied to the vertical deflection system although intensity modulation by the signal pulses, as described above, is preferred.

As illustrated in Fig. 5, the system of the invention provides a unitary simultaneous pattern of indications of all echo pulses received, wherein the individual indications do not overlap nor tend to merge together. Furthermore, the vertical separation between any two adjacent indications is also an indication of the separation in range of the two objects from which the corresponding echo pulses were received. Accordingly, as has previously been pointed out, small range differences can be more accurately determined by increasing the magnitude of the vertical sweep. If, in addition, appropriate vertical calibrated scales are provided for the expanded vertical sweeps on the indicator, as taught for example by the above-mentioned application of W. C. Tinus, the difference in range of any two closely adjacent reflecting objects can be accurately determined.

A modified timing circuit arrangement for use in systems of the type illustrated by the system of Fig. 1 is shown in block schematic diagram form in Fig. 6 and its operation will be described with reference to the diagrams of Fig. 7. It differs from the timing arrangement of the system of Fig. 1 in that the sawtooth wave generator 608 of the modified circuit is provided with two series of timing pulses having the characteristics as illustrated by pulse trains b and c, or e, respectively of Fig. 7.

Figure 7:
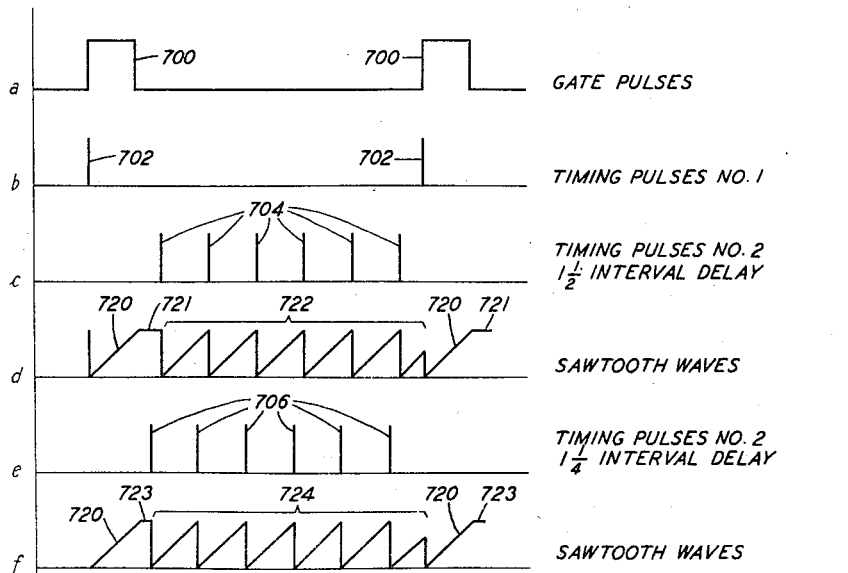
Fig. 7 comprises pulse versus time diagrams employed in explaining the operation of the timing circuit of Fig. 6.

In more detail in Figs. 6 and 7, gate pulses 700 of train a, Fig. 7, are generated by gate pulse generator 10, Fig. 6 and provided to timing pulser 602, Fig. 6 (number 1), which generates timing pulses 702 of train b, Fig. 7. Gate pulses 700 are also provided to variable delay device 604 of Fig. 6 and thence to timing pulser 606 which generates a series of timing pulses spaced one microsecond apart and delayed with respect to pulses 702 by the amount of delay instantly being provided by device 604. Train c of Fig. 7, for example, illustrates the condition for a delay of 1½ gate pulse widths (1½ microseconds as assumed above), while train e illustrates the condition for a delay of 1¼ gate pulse widths (1¼ microseconds).

In the timing arrangement illustrated by Figs. 6 and 7, the sawtooth wave generator 608 generates a sawtooth wave pulse 720 as shown in diagrams d and f, Fig. 7, in response to each timing pulse 702 from unit 602. Pulse 720 is, as shown, always coincident in time with the gating pulse 700 and serves to frequency modulate each outgoing transmitted pulse as described in connection with the system of Fig. 1 above. In addition, generator 608 generates a sawtooth wave pulse for each of the series of pulses 704, diagram c, or 706, diagram e, illustrated as the series 722 and 724, respectively, of diagrams d and f, respectively, of Fig. 7. A waiting period, 721 or 723, for example, diagrams d and f, respectively, is required between the end of pulse 720 and the beginning of the first pulse of pulse trains, 722 or 724, the length of which is, of course, determined by the instant value of delay being provided by the variable delay device 604. As for Fig. 1, variable delay device 604, is regularly varied through its normal range of variation of one microsecond by drive 30.

The method of incorporating the timing circuit illustrated by Figs. 6 and 7 in the system of Fig. 1 is indicated by the arrows and associated legends shown in Fig. 6, and it is obvious that with the timing circuit of Figs. 6 and 7, the system of Fig. 1 will produce substantially the identical results as described for the complete system of Fig. 1 above. The alternative timing arrangement of Figs. 6 and 7 may, in some instances, prove preferable to the timing arrangement incorporated in Fig. 1, in that the variable delay device 604 does not have to operate at the high radio frequencies usually employed in radar systems.

Analytically viewed, the system of Fig. 1, as described above, and with either of the two alternative timing arrangements, is a radar system having a "multiple-aperture" range gate, since for many instantaneous delay relation between the outgoing pulse and the sawtooth wave from beating oscillator 32 only echo pulses which are in coincidence with teeth of the sawtooth wave will produce intermediate frequency pulses which will pass through the filter section of unit 36. With sawtooth pulses 1 microsecond long and with the sawtooth wave synchronized with the outgoing pulse, the first echo which would be accepted would be that from an object at a range of 500 feet, the second 1000 feet, the third 1500 feet, and so on. (This follows from the fact that radio waves travel at the speed of light in free space, which is substantially 1000 feet per microsecond.) Thus, the apertures of the multiple-aperture range gate are "spaced" at "intervals" of 500 feet.

The effect of varying the delay relation as above described is obviously to sweep the multiple apertures of the range gate so that they successively cover all positions within the 500 foot intervals mentioned above. Thus, the range of any particular object from which a reflected pulse or echo is received will be a multiple of 500 feet, plus a fraction of 500 feet corresponding to the instantaneous setting of the variable delay device 28 at the time the echo is received. By use of the vertical displacement of the horizontal trace, together with a suitable calibrated vertical scale, the range of any object from which a reflection is obtained can be read directly from the indicator with a high degree of accuracy, the "horizontal" distance-scale providing a coarse indication and the "vertical" distance-scale providing the increment, or fractional part, of the last 500 foot interval to a high degree of accuracy. Also, a range marker could be used in exactly the same manner as in a conventional radar. For example, the range pulse from an ordinary range unit could be made to intensity modulate the cathode ray oscilloscope tube which would result in the addition of a vertical "range line" in Fig. 5. This line could be lined up with the leading edge of the echo in question to obtain a range reading or the range pulse could be applied to the vertical deflection plates to cause a break in each trace at range pulse time.

From the analytical multiple-range gate view, it is apparent that, broadly, the major general principles underlying the over-all system shown in Fig. 1 can be readily applied to a radar system employing exploratory pulses of constant frequency and a beating oscillator source of constant frequency, the latter being gated during each interval between successive pairs of exploratory pulses by a succession of regularly spaced gating pulses, the delay of which latter pulses is regularly varied so that the "multiple apertures" of the "range gate" successively occupy all intermediate positions between those for "zero" delay and maximum delay (one pulse interval). Obviously, the over-all circuit and particularly the indicating circuits of the system shown in Fig. 1 could readily be modified to operate with fixed frequency pulses as indicated immediately above. Some sacrifice in the ability to distinguish between objects closely adjacent in range would be involved which could be partly overcome by employing somewhat shorter pulses. This, in turn, would reduce the maximum power per pulse and the maximum range of the over-all system to substantially that of the conventional prior art radar system but would result in a system having superior resolving power with respect to small range differences as compared with prior art radar systems.

Numerous and varied other arrangements within the spirit and scope of the principles of the invention can, obviously, be readily devised by those skilled in the art. By way of example, underwater object detection systems employing compressional wave energy can be readily constructed to operate in accordance with the fundamental concepts of the invention. No attempt has here been made to exhaustively illustrate all such arrangements.

What is claimed is:

1. A pulse-reflection type object locating system comprising means for recurrently emitting a frequency modulated energy pulse of short duration, means for receiving reflections of said emitted pulses from reflecting objects upon which said emitted pulses impinge, means for generating a continuous succession of frequency modulated pulses each of said pulses being of the same duration and frequency variation range as said emitted pulses but having a mean frequency differing from the mean frequency of said emitted pulses by a convenient intermediate frequency, means for regularly varying the phase relation between said emitted pulses and said succession of pulses, means for combining said received reflections of said emitted pulses and said succession of pulses to obtain beat-note pulses of substantially constant frequency, means for selecting beat-note pulses having said convenient intermediate frequency, a cathode ray indicator having horizontal and vertical deflecting means and beam intensity control means, means connected to said horizontal deflecting means for sweeping the beam of said oscilloscope horizontally across the screen of said oscilloscope during the interval between succesive emitted pulses, means connected to said vertical deflecting means for sweeping the beam of said oscilloscope vertically across the screen of said oscilloscope in synchronism with the regular variation of said phase varying means, and means connecting the output of said intermediate frequency beat-note selecting means to said beam intensity control means, whereby a pattern of indications is obtained on the screen of said oscilloscope in which gross range can be ascertained by the horizontal displacement of each indication and incremental range, particularly between two indications closely adjacent in range, can be ascertained by the relative vertical displacement of each indication.

2. A frequency modulated pulse reflection radar system having a multipulse type multiple-aperture range gate for rendering the receiving portion of the radar receptive to a plurality of reflections of each emitted pulse when each said reflection is coincident in time with one of the gate pulses and means for recurrently sweeping the pulses of said multiple-aperture gate through a predetermined phase cycle, said radar system including a cathode ray oscilloscope indicator having horizontal and vertical deflecting means and beam intensity control means, said beam intensity control means being connected to the output of said range gate, a range sweep circuit electrically connected to said horizontal deflecting means of said indicator, and a multiple gate phase sweep circuit electrically interconnected between the means for recurrently sweeping the multiple range gate pulses through a predetermined phase cycle and said vertical deflecting means, whereby the reflected or echo pulses received by said radar system during different portions of said multiple gate phase sweep will appear on different vertically displaced horizontal sweeps and indications of objects closely adjacent in range can be readily distinguished from each other by their vertical as well as their horizontal displacements.

References Cited in the file of this patent

UNITED STATES PATENTS

| | | |
|---|---|---|
| 2,492,120 | Smith | Dec. 20, 1949 |
| 2,525,328 | Wolff | Oct. 10, 1950 |
| 2,612,636 | Rust et al. | Sept. 30, 1952 |